United States Patent [19]
Lang

[11] 3,902,039
[45] Aug. 26, 1975

[54] FERRITIC STEEL WELDING MATERIAL

[75] Inventor: Francis Harold Lang, Oakland, N.J.

[73] Assignee: The International Nickel Company, Inc., New York, N.Y.

[22] Filed: May 28, 1974

[21] Appl. No.: 473,669

Related U.S. Application Data

[62] Division of Ser. No. 11,298, Feb. 13, 1970.

[52] U.S. Cl.................................. 219/145; 219/73
[51] Int. Cl.²........................................ B23K 35/22
[58] Field of Search............ 75/123 K; 219/73, 137, 219/145, 146

[56] References Cited
UNITED STATES PATENTS

| | | | |
|---|---|---|---|
| 2,158,652 | 5/1939 | Becket et al. | 75/123 K |
| 3,195,230 | 7/1965 | Peck et al. | 219/146 X |
| 3,218,432 | 11/1965 | Peck | 219/137 |
| 3,309,243 | 3/1967 | Corrigan | 219/145 X |

*Primary Examiner*—J. V. Truhe
*Assistant Examiner*—N. D. Herkamp
*Attorney, Agent, or Firm*—Ewan C. MacQueen

[57] ABSTRACT

Directed to ferritic nickel steel filler materials for gas-shielded arc-welding of cryogenic steels, such as the 9 percent nickel steel, which contain about 7 percent to about 13 percent nickel with specially controlled amounts of manganese and carbon and which produce welds having markedly improved impact resistance at cryogenic temperatures.

3 Claims, No Drawings

FERRITIC STEEL WELDING MATERIAL

This is a division, of application Ser. No. 11,298, filed Feb. 13, 1970.

Ferritic low carbon steels containing nickel over the range of about 3.5 percent to about 9 percent are known to be useful structural materials particularly in relation to the provision of containers and other equipment for use at cryogenic temperatures. These steels are characterized by adequate strength and by high impact resistance particularly at very low temperatures on the order of minus 325°F. and lower. In the fabrication of such steels into vessels and other equipment, it is necessary to employ welding materials and methods of welding which will provide substantial strength at least approaching that of the material to be welded together with substantial impact resistance. For example, a design requirement applied to vessels produced from the 9 percent nickel steel produced under ASTM specification A 353-58, it is a requirement that the material possess an impact value as measured in the standard Charpy impact test of at least about 25 foot-pounds at minus 320°F. In welding the 9 percent nickel steel it is possible to use a nickel base filler material containing approximately 15 percent chromium and about 7 percent iron with the balance essentially nickel. Welds produced using such a welding material have adequate toughness, but tend to lack the strength which characterizes the base plate. Furthermore, because of the high nickel content of such welding materials, they tend to be expensive. The art has accordingly struggled with the problem of providing a ferritic filler material which could be employed in the welding of materials such as the 9 percent nickel steel so as to provide in weldments made of such material welds which would meet the requirement of a Charpy V-Notch impact value of at least 25 foot-pounds at minus 320°F. together with substantial tensile strength which would approximately match that of the base plate. One such development is described in U.S. Pat. No. 3,218,432. The material described in the said patent is a ferritic nickel steel containing approximately 12 percent nickel, about 0.03 to about 0.07 percent carbon and about 0.5 to about 0.8 percent manganese. In the production of such materials it has been found that vacuum melting is necessary in order to achieve the low gas content in the material which is required in order that the material when used in welding 9 percent nickel steel will provide joints having high toughness. The requirement for vacuum melting has introduced an undesirable cost aspect in the production of the material. Furthermore, it has been found in practice that the material is characterized by undesirable "arc-blow." This undesirable characteristic of the material tends to create weld defects such as porosity. In order to overcome the "arc-blow" characteristic of the material, alternating current welding using emissively coated wire has been found to be necessary. Furthermore, it has been found that in processing the material into wire suitable for use in automatic machines, that a vacuum anneal is required. It has been determined that the vacuum annealing was necessary to provide in the wire produced from this material a very high level of wire surface quality including freedom from adsorbed gases. All of the aforementioned factors have resulted in a reduced commercial acceptance for the material since the necessary processing required to produce the material is sufficiently expensive, that the material is no cheaper than the nickel-base alloys used prior to the introduction of the ferritic steel material. It was also found that the weld deposition rate which could be used in welding with the material had to be limited particularly in producing out of position welds as otherwise insufficient toughness was developed in the welds.

It accordingly became evident that it was desirable to produce a ferritic steel welding material which could be employed in the production of welds in nickel steels such as the 9 percent nickel steel which would have improved operability and which could be produced at a competitive price while still retaining the capacity for producing high toughness and strength in the welds produced using the material.

I have now discovered a ferritic steel welding material which can be produced by air melting and which will provide welds having high strength and toughness when used in the welding of low carbon nickel alloy steels.

Broadly stated, the present invention contemplates welding materials comprising ferritic nickel steels containing about 7 to about 13 percent nickel, not more than about 0.45 percent manganese, up to about 0.09 percent carbon, up to about 0.15 percent silicon, up to about 0.05 percent aluminum, up to about 0.1 percent titanium, up to about 0.1 percent columbium and the balance essentially iron. The phosphorus and sulfur contents of the material should be low, i.e., should not exceed about 0.01 percent each. In a more preferred aspect of the invention the welding material contains about 9.5 to about 11.5 percent nickel, not more than about 0.05 percent carbon, not more than about 0.3 percent manganese, not more than about 0.1 percent silicon, not more than about 0.02 percent aluminum, about 0.02 to about 0.06 percent titanium and not more than about 0.005 percent each of phosphorus and of sulfur. A preferred composition provided in accordance with the invention contains about 11 percent nickel, about 0.05 percent carbon, about 0.2 percent manganese, not more than about 0.1 percent silicon, about 0.03 percent aluminum, about 0.05 percent titanium, not more than about 0.005 percent each of phosphorus and sulfur and the balance essentially iron. The special welding material can be produced by conventional air melting practice provided that the melt is thoroughly killed with deoxidizers such as silicon, aluminum, titanium and calcium. It is found that properly deoxidized air melts generally will not contain more than about 0.015 percent oxygen, not more than about 0.006 percent nitrogen, and not more than 0.0003 percent hydrogen. It is further found that as long as the manganese content does not exceed 0.45 percent and the contents of oxygen, nitrogen and hydrogen do not exceed 0.015 percent, 0.006 percent and 0.0003 percent, respectively, good Charpy impact values are obtained in welds provided in accordance with the invention.

It is also found that compositions provided in accordance with the invention are suitable for use as castings characterized by substantial strength and very high toughness at cryogenic temperatures.

It is found that the filler materials provided in accordance with the invention provide exceptionally high impact values together with adequate strength at cryogenic temperatures such as minus 320°F. or even minus 450°F.

It is important in connection with the invention that the elements as described hereinbefore be present in the ranges set forth. Manganese is a particularly important element and must be controlled as stated to achieve the high impact values which characterize weld deposits produced in accordance with the invention. Thus manganese should not exceed about 0.45 percent if the desired results, particularly high toughness at cryogenic temperatures, are to be obtained in welds produced using the filler material of the invention. It is found that carbon control in conjunction with the manganese content is also important. Thus, when manganese exceeds 0.3 percent, carbon preferably is at least about 0.05 percent. More advantageously, the manganese content does not exceed about 0.3 percent so as to achieve optimum impact strength over the entire carbon range contemplated. Sulfur should not exceed about 0.01 percent in order to assure that the effects of this detrimental element in fostering weld metal cracking and reduction of impact strength can be adequately countered by the amount of manganese present. When the sulfur is low, e.g., 0.005 percent or less, it is found that about 0.12 percent or about 0.15 percent manganese will assure satisfactory results. Nickel is also an important element in accordance with the invention and must be maintained within the stipulated range. Thus, at nickel contents above about 13 percent, it becomes difficult to obtain satisfactory weld toughness levels. Increasing nickel from about 7 to about 11 percent has the effect of lowering both the maximum shelf energy absorption level and the temperature of transition from ductile to brittle failure. Filler materials containing as little as 7 percent nickel are adequate for the production of welds which do not need to be exposed to severe cryogenic temperatures and quite good toughness results are achieved at temperatures on the order of minus 200°F. which may be availed of when welds are to be produced in 3.5 percent nickel steel plate. Carbon exerts virtually linear effects on weld metal tensile strength and toughness at minus 320°F. Carbon may be present over the entire range of 0.001 to about 0.09 percent without encountering unduly adverse effects on toughness at minus 320°F. Titanium contents up to 0.1 percent do not affect weld properties or soundness detrimentally. Indications are that in the presence of carbon contents above about 0.03 percent, titanium in the range of 0.05 percent to 0.1 percent is beneficial to weld toughness. Aluminum may be employed with advantage as a deoxidizer and it is found that the residual contents of aluminum resulting from the use of this deoxidizer are not detrimental to weld metal properties. It is also found that columbium may be used in amounts up to about 0.1 percent with substantial effects in relation to the tensile strength of the resulting welds but without greatly reducing the impact values at temperatures circa minus 320°F.

It is found not only that the special welding materials provided in accordance with the invention can be produced by air melting, but that the ingots can be converted to wire using standard practices without difficulty. It is unnecessary to vacuum anneal the wire in order to avoid deleterious effects during welding.

Welds produced using the especially preferred filler metals in terms of composition, including low gas content, provided in accordance with the invention will provide at minus 320°F. a Charpy V-Notch impact value of at least 80 foot-pounds when produced by the manual tungsten inert gas (TIG) process. It is appreciated that the manual TIG process is not widely used in industry to weld heavier sections, i.e., above about ¼ inch. However, the ability of the material to provide in welds such a high impact value at minus 320°F. may be taken as a practical indication that ample toughness will still be available in the weld when other welding processes including the metal inert-gas shielded-process (MIG process), the "shorting arc" process, or the "pulsed arc" process, are employed. The shielding gas employed should be essentially devoid of oxygen, nitrogen, or carbon dioxide, or any other oxidizing gas, so as to maintain the weld deposit as low in gas as possible. Under some rather extreme conditions, for example, when the "pulsed arc" process is used, a small amount of oxygen may be present in the shielding gas in the interest of improving arc stability without ruinously effecting the toughness of the resulting welds.

In order to give those skilled in the art a better appreciation of the advantages of the invention, a number of heats were made which had the compositions set forth in the following Table I. The heats were prepared from pure materials including electrolytic iron and electrolytic nickel. An air induction furnace was employed. In each instance the heats were deoxidized with silicon metal, aluminum and titanium. When the melts were in proper condition for casting, 7 mm. rods were extracted by vacuum using vycor tubes. The remainder of the melt in each case was then cast into an ingot which was converted to wire.

TABLE I

| Alloy No. | C | Ni | Mn | Si | Al | Ti | Cb |
|---|---|---|---|---|---|---|---|
| 1 | 0.003 | 11.0 | 0.20 | 0.10 | <0.02 | 0.02 | — |
| 2 | 0.004 | 12.6 | 0.15 | 0.07 | <0.02 | 0.02 | — |
| 3 | 0.08 | 10.8 | 0.16 | 0.06 | <0.02 | 0.02 | — |
| 4 | 0.08 | 12.7 | 0.12 | 0.06 | <0.02 | 0.02 | — |
| 5 | 0.004 | 11.3 | 0.15 | 0.03 | 0.03 | 0.033 | — |
| 6 | 0.004 | 11.3 | 0.15 | <0.03 | <0.02 | 0.06 | — |
| 7 | 0.07 | 11.1 | 0.16 | 0.05 | 0.02 | 0.02 | — |
| 8 | 0.07 | 11.1 | 0.15 | 0.04 | <0.02 | 0.05 | — |
| 9 | 0.07 | 11.1 | 0.15 | 0.03 | <0.02 | 0.10 | — |
| 10 | 0.087 | 11.1 | 0.15 | 0.03 | 0.01 | 0.02 | — |
| 11 | 0.090 | 11.1 | 0.17 | 0.08 | 0.08 | 0.05 | — |
| 12 | 0.089 | 11.1 | 0.28 | 0.06 | 0.02 | 0.05 | — |
| 13 | 0.087 | 11.1 | 0.44 | 0.08 | 0.07 | 0.06 | — |
| 14 | 0.001 | 11.1 | 0.17 | 0.08 | 0.04 | 0.05 | — |
| 15 | 0.085 | 9.0 | 0.18 | 0.09 | 0.025 | 0.05 | — |
| 16 | 0.082 | 7.0 | 0.18 | 0.10 | 0.014 | 0.05 | — |
| 17 | 0.088 | 11.0 | 0.20 | 0.14 | 0.024 | 0.06 | 0.05 |
| 18 | (0.088) | (11.0) | 0.19 | 0.13 | 0.015 | 0.05 | 0.06 |
| 19 | (0.088) | (11.0) | 0.18 | 0.10 | 0.010 | 0.03 | 0.09 |

TABLE I – Continued

| Alloy No. | S | P | Fe | O | N | H |
|---|---|---|---|---|---|---|
| 1 | 0.002 | 0.004 | Bal. | — | — | — |
| 2 | 0.002 | 0.004 | Bal. | −0.0150 | 0.0051 | 0.00025 |
| 3 | 0.002 | 0.003 | Bal. | −0.0115 | 0.0032 | 0.00020 |
| 4 | 0.002 | 0.003 | Bal. | — | — | — |
| 5 | N.A. | N.A. | Bal. | — | — | — |
| 6 | N.A. | N.A. | Bal. | — | — | — |
| 7 | N.A. | N.A. | Bal. | — | — | — |
| 8 | N.A. | N.A. | Bal. | — | — | — |
| 9 | N.A. | N.A. | Bal. | — | — | — |
| 10 | 0.004 | 0.003 | Bal. | −0.0120 | 0.0051 | 0.00020 |
| 11 | 0.003 | 0.003 | Bal. | −0.0074 | 0.0080 | 0.00021 |
| 12 | 0.003 | 0.003 | Bal. | −0.0140 | −0.0095 | 0.00021 |
| 13 | 0.003 | 0.003 | Bal. | −0.0140 | 0.0042 | 0.00017 |
| 14 | 0.004 | 0.003 | Bal. | — | — | — |
| 15 | 0.003 | 0.003 | Bal. | — | — | — |
| 16 | 0.003 | 0.003 | Bal. | — | — | — |
| 17 | 0.003 | 0.003 | Bal. | — | — | — |
| 18 | 0.003 | 0.003 | Bal. | — | — | — |
| 19 | 0.003 | 0.003 | Bal. | — | — | — |

N.A. = Not Analyzed

EXAMPLE I

Butt welds were prepared by the inert gas tungsten art process (TIG) between plates of a commercial 9 percent nickel steel ½ inch thick by 4 inches by 3 inches using as fillers ⅛ inch diameter rod. The plates were in the mill quenched and tempered condition and had the following composition: 9 percent nickel, 0.12 percent carbon, 0.52 percent manganese, 0.087 percent aluminum, 0.014 percent titanium, 0.23 percent silicon, 0.005 percent phosphorus, 0.006 percent sulfur, 47 parts per million of oxygen, 0.9 part per million of hydrogen and 34 parts per million of nitrogen. The plate material had a yield strength (0.2 percent offset) of 112,900 psi, a tensile strength of 120,400 psi, an elongation of about 21 percent, and a reduction in area of about 70 percent. At minus 320°F. the plate material had a Charpy V-Notch impact value of 28–39 foot-pounds. The plates were prepared for welding by machining a 4 inch edge of each of the joint members into a standard single V-groove configuration. The joint had a 70° angle between the members with root spaces between 1/64 inch and 1/16 inch. The plates were centered over a grooved copper backing bar imbedded in a steel welding bench and restrained from distortion by heavy duty U-clamps. The joints were welded in the flat position without preheat using 9 passes, manually controlled, at about 180 amperes direct current straight polarity. A maximum interpass temperature of 250°F. was maintained throughout welding of the joint. The welding torch was fitted with a ⅛ inch diameter thoriated tungsten electrode and arc shielding was argon, flowing at 40 cubic feet for 1 hour. The completed joints were radiographed at 2 percent sensitivity and no cracks or oxide inclusions were observed. The welded plates were sliced perpendicular to the joint and tensile specimens and Charpy V-Notch impact specimens were machined from the slices. The notch in the Charpy V-Notch specimens was machined perpendicular to the plate face. The tensile properties and Charpy V-Notch impact properties at various temperatures are set forth in the following Table II. In Table II the results given for welds made using fillers of Alloys No. 1 through 9 were all obtained upon transverse specimens as were the impact values for welds made using fillers of Alloys 10 through 19. The tensile results for Alloys 10 through 19 were obtained on all-weld-metal specimens and on transverse specimens with the results obtained on all-weld-metal specimens being given first for each of these alloys.

TABLE II

| Alloy No. | TENSILE PROPERTIES | | | | CVN (Ft.-Lbs.) | | | | |
|---|---|---|---|---|---|---|---|---|---|
| | 0.2% Y.S. (ksi) | U.T.S. (ksi) | % Elong. (in 1″) | % R.A. | R.T. | −100°F. | −200°F. | −320°F. | −452°F. |
| 1 | 112.1 | 120.5 | 15.0 | 75 | — | — | — | 143 | — |
| 2 | 110.0 | 117.7 | 16.0 | 76 | — | — | — | 106 | — |
| 3 | 114.1 | 122.9 | 9.0 | 70 | — | — | — | 97 | — |
| 4 | 115.9 | 125.0 | 8.0 | 65 | — | — | — | 72 | — |
| 5 | — | — | — | — | — | — | — | 95, | 111 | — |
| 6 | 102.1 | 117.4 | 16 | 73 | 140 | 148 | 132 | 83+ | 59,117,122 |
| 7 | 116.2 | 126.7 | 14 | 69 | — | — | — | 108, | 129 | — |
| 8 | 121.1 | 132.9 | 12 | 61.5 | — | — | — | 119, | 137 | — |
| 9 | — | — | — | — | — | — | — | 100, | 108 | — |
| 10 | 123.9 | 158.8 | 17.0 | 70.5 | 129*, | 126*, | 127* | 109*, | — |
| | 111.0 | 121.3 | 15.0 | 71.5 | 127 | 139* | — | 102* | — |
| 11 | 119.8 | 147.7 | 17.0 | 70.0 | 90, | 99, | 99, | 82, | — |
| | 112.8 | 124.0 | 14.0 | 71.0 | 111 | 103 | 94 | 59 | — |
| 12 | 122.0 | 154.7 | 16.0 | 65.5 | 92, | 76, | 89, | 52, | — |
| | 113.8 | 125.4 | 13.0 | 67.5 | 97 | 102 | 80 | 64 | — |
| 13 | 131.3 | 155.8 | 17.0 | 69.5 | 95, | 118, | 118, | 98, | — |
| | 115.1 | 126.6 | 12.0 | 66.0 | 111 | 118 | 105 | 87 | — |
| 14 | 99.4 | 111.1 | 23.0 | 82.0 | 164*, | 146*, | 141*, | 128*, | — |
| | 110.3 | 122.7 | 17.0 | 78.0 | 161* | 148* | 146* | 130* | — |
| 15 | 117.7 | 139.6 | 19.0 | 73.0 | 131*, | 143*, | 122*, | 84, | — |
| | 117.2 | 127.6 | 11.0 | 64.0 | 144* | 136* | 111* | 70 | — |
| 16 | 92.7 | 117.4 | 22.0 | 78.5 | 178*, | 177*, | 150* | 40, | — |
| | 96.0 | 112.8 | 19.0 | 79.5 | 166* | 193* | — | 36 | — |

TABLE II

| Alloy No. | TENSILE PROPERTIES | | | | CVN (Ft.-Lbs.) | | | | |
|---|---|---|---|---|---|---|---|---|---|
| | 0.2% Y.S. (ksi) | U.T.S. (ksi) | % Elong. (in 1") | % R.A. | R.T. | −100°F. | −200°F. | −320°F. | −452°F. |
| 17 | 126.6 | 153.8 | 17.0 | 68.5 | 110, | 101, | 89, | 40, | — |
|  | 115.1 | 126.3 | 12.0 | 63.5 | 119 | 88 | 104 | 52 | — |
| 18 | 123.9 | 172.7 | 16.0 | 68.0 | 106, | 80, | 84, | 46, | — |
|  | 115.7 | 126.9 | 11.0 | 63.0 | 114 | 118 | 68 | 40 | — |
| 19 | 124.1 | 168.3 | 16.0 | 65.0 | 116, | 84, | 83 | 51, | — |
|  | 113.3 | 123.9 | 13.0 | 67.0 | 103 | 94 | — | 34 | — |

*Indicates specimen did not break completely.

It is to be noted that the impact results at −320°F. for Alloys 11 and 12 were low and these results are attributed to the high gas contents, particularly nitrogen, found in these alloys.

It is to be noted from Table II that the tensile properties of welds produced using the columbium-containing filler materials of Alloys No. 17, 18 and 19 were markedly improved as compared to similar columbium-free materials while still retaining substantial impact resistance at minus 320°F. This fact enables the production of welds having matching strength in cryogenic steels having higher tensile strengths than presently available 9 percent nickel steels. The data pertaining to Alloy No. 6 demonstrate that remarkable toughness is obtained according to the invention even at minus 452°F. No post-weld heat treatment is required to obtain high toughness in the welds, although stress relief at about 1050°F. does improve toughness. It is to be seen from data set forth in Table II that very high impact values at minus 320°F. were obtained.

In contrast to the results set forth in Table II, a further series of welds was made in the same plate using identical procedures and using filler materials having the compositions outside the invention as set forth in the following Table III.

EXAMPLE II

Two butt welds are prepared by the automatic inert gas metal arc process (MIG process) using as a consumable electrode 0.062 inch diameter filler wire of Alloy 1 for one weld, and 0.062 inch diameter commercially produced wire outside the invention (Alloy E) made without a deliberate titanium addition which contained 13.3 percent nickel, 0.07 percent carbon, 0.45 percent manganese, less than 0.01 percent aluminum, 0.02 percent silicon, 0.004 percent phosphorus, 0.003 percent sulfur, 43 parts per million of oxygen, 2.1 parts per million of hydrogen and 6.1 parts per million of nitrogen. The plate material employed was the same material described in conjunction with Example I and the plates employed were each ½ inch by 4 inches by 8 inches which were prepared for welding by machining an 8 inch edge of each of the two members with a single V groove configuration. The joints provided a 70° angle between the members, a 1/16 inch root face and a 1/16 root space. The joint was centered over a grooved copper backing plate in a 4 inch thick steel welding bench and the joint members were held in position by four heavy U-strap clamps. Welding was accomplished in the flat position without preheat and a maximum inter-

TABLE III

| Alloy No. | C | Ni | Mn | Si | Al | Ti | Cb | S | P | Fe |
|---|---|---|---|---|---|---|---|---|---|---|
| A | 0.006 | 10.9 | 0.44 | <0.05 | 0.03 | 0.03 | — | 0.002 | 0.003 | Bal. |
| B | 0.005 | 12.7 | 0.51 | 0.08 | <0.02 | 0.02 | — | 0.002 | 0.003 | Bal. |
| C | 0.068 | 10.8 | 0.55 | 0.07 | <0.02 | <0.02 | — | 0.002 | 0.003 | Bal. |
| D | 0.066 | 12.7 | 0.56 | 0.09 | 0.02 | 0.02 | — | 0.002 | 0.003 | Bal. |

Note: Alloy A contained 0.0195% oxygen, 0.004% nitrogen and 0.00021% hydrogen while Alloy C contained 0.0105% oxygen, 0.0031% nitrogen and 0.0002% hydrogen The properties of welds produced using the filler materials of Table III are set forth in the following Table IV.

TABLE IV

| Alloy No. | TENSILE PROPERTIES | | | | CVN (Ft.-Lbs.) −320°F. |
|---|---|---|---|---|---|
| | 0.2% Y.S. (ksi) | U.T.S. (ksi) | % Elong. (in 1") | % R.A. | |
| A | 112.7 | 124.9 | 9.0 | 69.0 | 31 |
| B | 113.3 | 118.1 | 5.0 | 10.5 | 35 |
| C | 114.7 | 124.7 | 11.0 | 70 | 40 |
| D | 115.5 | 125.4 | 13.0 | 70 | 44 |

It is to be seen by contrasting the data set forth in Table IV with those set forth in Table II, that weld results produced using filler materials within the invention are very substantially higher particularly with regard to impact resistance at minus 320°F. than are the values obtained with filler materials outside invention.

pass temperature of 250°F. was maintained. All beads were deposited automatically at about 300 amperes, 30 volts direct current reverse polarity at a welding speed of 15 inches per minute. Wire was fed at a rate of about 180 inches per minute using a gas metal-arc torch with argon shielding gas flowing at 50 cubic feet per hour. Both joints were completed in six passes. The completed joints were radiographed to the 2 percent sensitivity and found to be free of cracking, inclusions and objectionable porosity. Transverse tensile specimens machined from the welds were tested at room temperature and transverse-Charpy specimens were tested at room temperatures minus 100°F., minus 200°F. and minus 320°F., with the results shown in Table V. The superiority of the welds produced using filler material in accordance with the invention, particularly in relation to the impact energy at cryogenic temperatures, is marked as may be noted from the data in Table V.

in five passes and eight passes, respectively, with a maximum interpass temperature of 250°F. being maintained. All beads were deposited automatically at about 300 amperes, 30 volts direct current reverse polarity at welding speeds of 10 inches per minute for the five pass weld, and 20 inches per minute for the eight pass weld. Wire was fed at a rate of about 180 inches per minute using a gas metal-arc torch with argon shielding gas flowing at 50 cubic feet per hour. The completed joints were radiographed to a 2 percent sensitivity and found

TABLE V

| Weld No | Filler material | Weld properties | | | | |
|---|---|---|---|---|---|---|
| | | Room Temperature Tensile strength (psi) | Room | Charpy V-Notch Value* −100°F. | −200°F. | −320°F. |
| 243 | Alloy No. 1 | 119,400 | 90.5 | 88.5 | 85.5 | 63.2 |
| 242 | Alloy E | 128,700 | 67.5 | 62.3 | 53.5 | 35.0 |

*Average of two specimens

During production of the welds as described in this Example II, it was noted that severe "arc-blow" was encountered during deposition of each bead using the material of Alloy E, whereas with the welding material provided in accordance with the invention (Alloy 1) some arc instability was noted during the deposition of the first bead but no such arc instability was noted in the subsequent passes. The substantial freedom from "arc-blow", i.e., reduction in arc instability, which characterizes the welding material provided in accordance with the invention is an important advantage since it minimizes the chances for defects to occur in the weld and reduces weld grinding or repair, thus lowering cost.

EXAMPLE III

In order to ascertain the extent to which weld properties might be affected in a detrimental direction by making welds in a 9 percent nickel commercial steel having higher impurity content, two further butt welds were prepared by automatic inert gas metal arc process using the consumable electrode 0.062 inch filler wire of Alloy No. 1. The plate employed contained about 8.5 percent nickel, 0.11 percent carbon, 0.79 percent manganese, 0.056 percent aluminum, less than 0.01 percent titanium, 0.22 percent silicon, 0.002 percent phosphorus, 0.019 percent sulfur, 16 parts per million of oxygen, 1.3 parts per million of hydrogen and 37 parts per million of nitrogen. The commercial steel was in the mill normalized and tempered condition and had a yield strength (0.2 percent offset) of 104.5 psi, a tensile strength of 116,600 psi, a reduction in area of 66 percent and elongation of 23 percent. At minus 320°F. the plate material had a Charpy V-Notch impact value of 32–33 foot-pounds. In each case, plates ½ inch thick by 5 inches by 10 inches were employed. The weld joints were prepared by machining a 10 inch edge of each of the members with a single V-groove configuration. The joint design provided an 80° angle between the members, a 1/16 inch root face, and a 1/16 inch root space. The joint was centered over a grooved copper backing plate held in the 4 inch thick steel welding bench. The joint members were held in position to the welding bench by four heavy-duty U-strap clamps. The joints were welded in the flat position without preheat to be free of cracking, inclusions and objectionable porosity.

Transverse tensile and Charpy specimens were machined from the welds and tested as described in Example II. The results as shown in the following Table VI.

TABLE VI

| Weld No. | No. of Passes | Room Temp. Tensile Strength psi | Charpy V-Notch Impact Value at −320°F. | | |
|---|---|---|---|---|---|
| 22586 | 5 | 120,000 | 54.5, | 65, | 65.5 |
| 22587 | 8 | 114,200 | | 79, | 74.5 |

EXAMPLE IV

Material from Alloy No. 1 was drawn to 0.036 inch diameter for welding. A butt weld was made in plate material of the composition and processing described in Example I by the short-arc (fine wire) process. The plates were ½ inch by 2½ by 9 inches and were prepared for welding by machining a 9 edge of each member to a standard single V-groove configuration. The joint design provided an 80° angle between the members, a 1/16 inch root face, and a 3/32 inch root space. The joint was clamped to a 1 inch thick grooved steel plate maintained in a vertical position by four heavy duty C-clamps to prevent distortion and afford maximum restraint. The joint was welded in the vertical position without preheat in six passes using the short-arc (line wire) process manually controlled, at about 110 amperes, 21 volts direct current reverse polarity. A maximum interpass temperature of 250°F. was maintained and arc shielding consisted of a mixture of 50 cubic feet per hour of helium and 10 cubic feet per hour of argon. Standard transverse Charpy V-Notch impact specimens and tensile specimens were removed from the joint and tested. The weld demonstrated a tensile strength in the transver direction of 112,300 psi and an impact energy at minus 320°F. in two tests of 41 foot-pounds and 34 foot-pounds. This weld demonstrated that high strength and excellent low temperature toughness were produced in an out-of-position joint made at high deposition rate using the filler material of the invention.

EXAMPLE V

A 6 inch long joint was produced between two one-half inch thick by 3 inch wide pieces of 3.5 percent nickel steel. The steel was in the condition resulting from normalizing and tempering, and has a yield strength (0.2 percent offset) of 57,200 psi, a tensile strength of 86,600 psi, 25 percent elongation and 64 percent R.A. The pieces of steel plate were machined to provide a 60° V-joint therebetween, and a weld was produced therebetween by the gas tungsten-arc process feeding ⅛ inch filler wire manually. The filler wire employed was that of Alloy No. 15. The weld was examined both visually and radiographically and was found to be free of cracking and porosity. Transverse tensile and Charpy specimens removed from the joint had ultimate tensile strengths of 93.3 and 93.0 ksi, elongations of 27 percent and 14 percent, Charpy impact values of 207 and 200 foot-pounds at room temperature, 168 and 174 foot-pounds at minus 50°F. and 115 and 141 foot-pounds at minus 150°F., respectively. The example demonstrates that the filler materials of this invention are useful for welding a variety of cryogenic steels.

EXAMPLE VI

A 30 pound air induction melted heat of a composition similar to that of Alloy No. 1 was prepared and used to produce castings which included a fluidity spiral, a ladder casting, and a keel block. The alloy had the following composition: 0.003 percent carbon, 10.9 percent nickel, 0.19 percent manganese, 0.07 percent silicon, 0.002 percent sulfur, 0.006 percent phosphorus, 0.03 percent aluminum and 0.03 percent titanium. Standard Charpy V-Notch specimens were cut from the legs of the keel block, heat treated and tested at minus 320°F. Material subjected to a double normalizing heat treatment for one hour at 1650°F., and at 1450°F. for one hour and a reheat at 1050°F. for two hours with air cooling between each heat treatment step, provided an impact energy at minus 320°F. of 66, 61 and 62 foot-pounds. Material heat treated by austenitizing at 1550°F. for 1 hour, water-quenched and then reheated to 1050°F. for 2 hours and air cooled demonstrated at minus 320°F. impact energy of 51, 91 and 78 foot-pounds. In addition to the excellent low temperature toughness demonstrated by these data, the fluidity spiral and ladder castings indicated a high level of castability for the alloy.

Steels which may be welded in accordance with the invention contain about 3 to about 10 percent nickel, up to about 0.15 percent, e.g., about 0.01 to about 0.08 percent carbon, up to about 2.0 percent, e.g., about 0.01 to about 1 percent manganese, up to about 0.02 percent sulfur, up to about 0.02 percent phosphorus, up to about 3 percent chromium, up to about 2 percent molybdenum and the balance essentially iron.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In the welding of cryogenic nickel steels by a gas-shielded arc-welding process wherein filler material is supplied to the arc during welding, the improvement which comprises employing as a filler material in said process, a ferritic nickel steel composition consisting of, by weight, about 7% to about 13 percent nickel, not more than 0.45 percent manganese, not more than 0.09 percent carbon, not more than 0.15 percent silicon, not more than 0.05 percent aluminum, up to about 0.1 percent titanium, up to about 0.1 percent columbium, not more than 0.01 percent phosphorus, not more than 0.01 percent sulfur, not more than 0.015 percent oxygen, not more than 0.006 percent nitrogen, not more than 0.0003 percent hydrogen, and the balance essentially iron, with the proviso that the content of said carbon is at least about 0.05 percent when said manganese exceeds about 0.3 percent.

2. A process in accordance with claim 1 wherein said filler material contains no more than about 0.3 percent manganese and no more than about 0.05 percent carbon.

3. A process in accordance with claim 2 wherein said filler material contains about 9.5 to 11.5 percent nickel.

* * * * *